Figure 1:
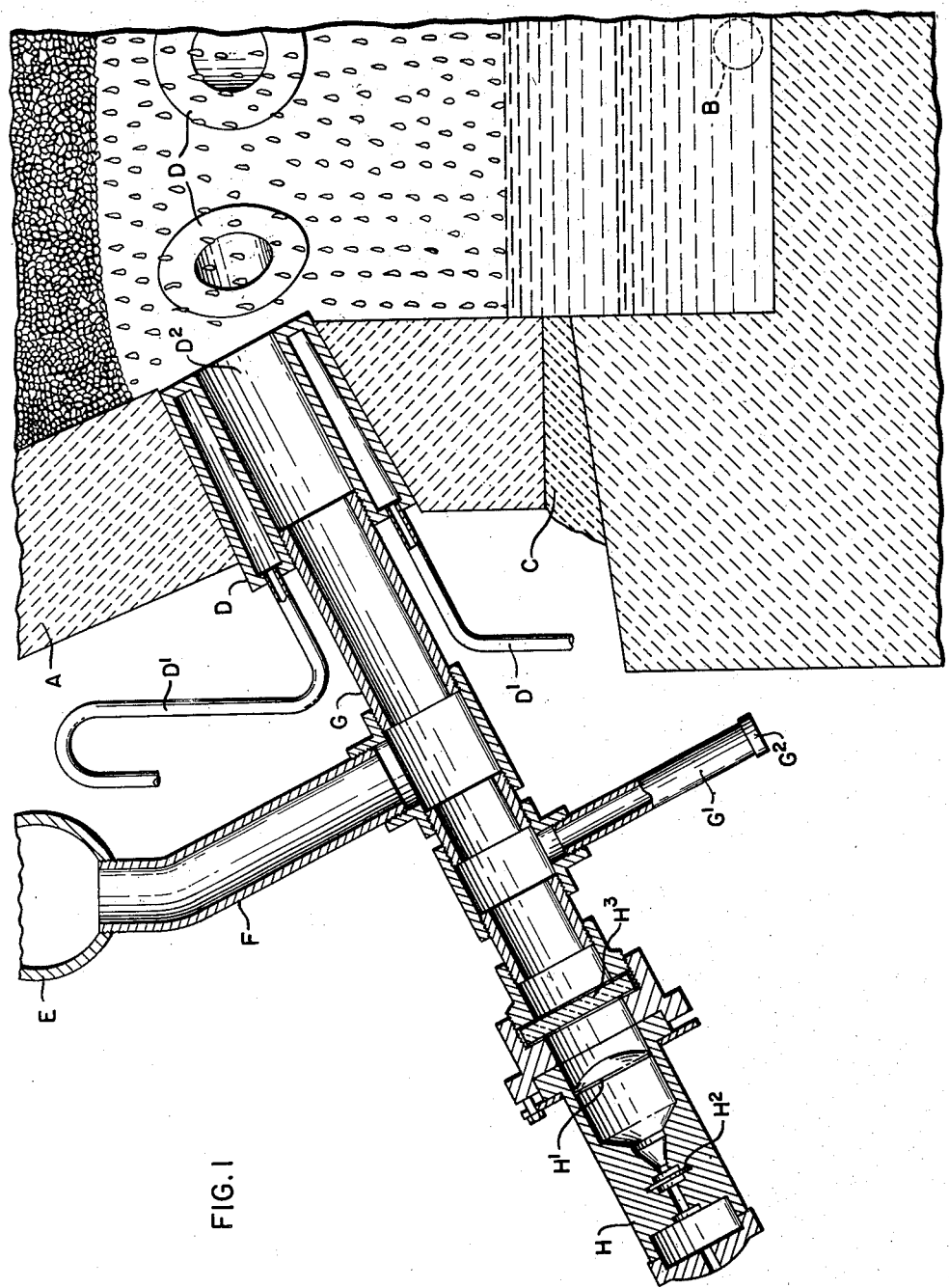

Aug. 31, 1948.   J. P. VOLLRATH   2,448,199
CONTROL SYSTEM FOR BLAST FURNACE AIR
Filed July 11, 1944   2 Sheets-Sheet 1

INVENTOR.
JOSEPH P. VOLLRATH
BY
ATTORNEY.

INVENTOR.
JOSEPH P. VOLLRATH
BY
C.B.Spangenberg
ATTORNEY.

Patented Aug. 31, 1948

2,448,199

UNITED STATES PATENT OFFICE 2,448,199

CONTROL SYSTEM FOR BLAST FURNACE AIR

Joseph P. Vollrath, North Wales, Pa., assignor to The Brown Instrument Company, Philadelphia, Pa., a corporation of Pennsylvania Application July 11, 1944, Serial No. 544,405

5 Claims. (Cl. 266—30)

The general object of the present invention is to provide an improved method of and apparatus for regulating the operation of a blast furnace, and particularly a blast furnace of the type commonly used in the production of pig iron.

As is well known, in the production of pig iron, iron ore, coke and usually limestone or other fluxing material are fed into the blast furnace at its top, and preheated air or blast is forced into the blast furnace at its bottom. Gases formed and liberated in the furnace are withdrawn at its top, and molten iron and slag are withdrawn at the bottom of the furnace. Within the furnace, the temperature increases from the top of the furnace to the level of the tuyères through which the blast air is passed into the furnace. The portion of the furnace chamber extending from the tuyère level upward for several feet is customarily called the "fusion zone" of the furnace, since in that zone the iron and slag are both in molten condition and trickle down through the coke which is the only solid material present in significant amount in the fusion zone. The temperature at the top of the fusion zone is of the order of 1500° C. and progressively increases from the top of the zone to the tuyère level, where the temperature is of the order of 1850°. In ordinary practice, however, the temperatures maintained at different levels in the fusion zone are not constant but vary with operating conditions.

The primary object of the present invention is to provide a simple and practical method of regulating the operation of the furnace so as to maintain desirable fusion zone temperatures. In carrying out my invention I measure the heat radiation from the fusion zone of the furnace and thereby obtain a fusion zone temperature measurement and utilize that measurement as a basis for adjustments in furnace operating conditions which contribute to the maintenance of the measured fusion zone temperature which has been found or is assumed to give, or to attend, the attainment of practically optimum results in the operation of the furnace.

In measuring the heat radiation from the fusion zone of the furnace, I advantageously combine a radiation pyrometer which may be of known type with one of the tuyères through which blast air is passed into the lower portion of the furnace in such manner that the radiation pyrometer may be focused on a portion of the fusion zone contents, mostly incandescent coke, at the tuyère level, and I utilize the blast air passed into the furnace through the tuyère to protect the radiation pyrometer from over-heating and to prevent interference by furnace dust with the heat radiation to the pyrometer from the fusion zone. In practice, the temperature measuring apparatus employed will ordinarily include a recording potentiometer providing an accurate record of the temperature of the portion of the fusion zone on which the radiation pyrometer is focused.

In some cases, the recording potentiometer may advantageously include control provisions through which the operation of the blast furnace may be automatically regulated by and in accordance with variations in the fusion zone temperature measurement. Major advantages of the present invention may be obtained, however, by non-automatic regulatory actions effected by the furnace operator to compensate or correct for objectionable variations in the temperature measured. In general, the regulatory actions made automatically, or non-automatically, in response to variations in the measured fusion zone temperature, may include one or more of the following, namely: a regulation of the temperature of the blast air entering the furnace; a regulation of the weight rate at which the blast air is passed into the furnace; and a regulation of the humidity or moisture content of the blast air entering the furnace.

In general, an increase in the blast air temperature, an increase in the weight rate at which blast air is passed into the furnace, and a decrease in the moisture content of the blast air, each tend to increase the fusion zone temperature. Conversely, a decrease in the blast air temperature; a decrease in the weight rate of blast air supply and an increase in the moisture content of the blast air each tend to decrease the fusion zone temperature. The tendency of an increase or decrease in the blast air temperature to increase or decrease the fusion zone temperature will be apparent. An increase or decrease in the weight rate of blast air passed into the furnace results in an increase or decrease in the rate in which heat of combustion is liberated in the furnace and thereby tends directly to an increase or decrease in the fusion zone temperature. An increase or decrease in the moisture content of the blast air tends to respectively decrease or increase the fusion zone temperature because hydrogen and oxygen constituents of said moisture content are disassociated in the furnace by an endothermic, furnace-cooling reaction.

The various features of novelty which characterize my invention are pointed out with particularity in the claims annexed to and forming a part of this specification. For a better understanding of the invention, however, its advantages, and specific objects attained by its use, reference should be had to the accompanying drawing and descriptive matter in which I have illustrated and described a preferred embodiment of the invention.

Figure 2:
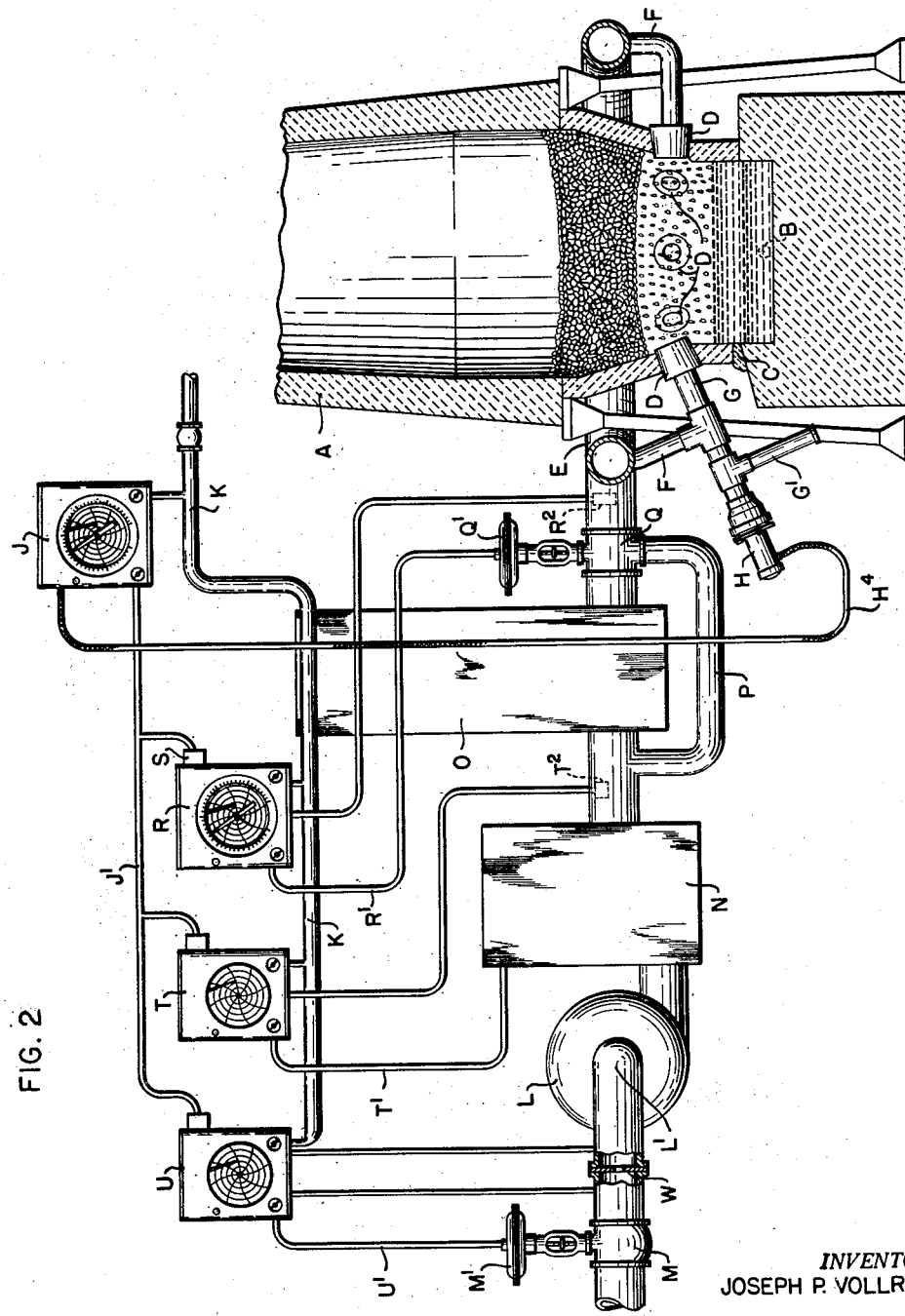

Of the drawings:

Fig. 1 is a somewhat diagrammatic section of the lower portion of a blast furnace and associated temperature measuring means; and Fig. 2 is a diagrammatic representation of a portion of a blast furnace and associated controlling apparatus.

In Fig. 1 I have illustrated the lower portion of a blast furnace A of a conventional type and form, having the usual tapping hole B, a cinder notch C, water-cooled tuyères D and associated water cooling pipe connections D', and a bustle pipe E with branches F through which the hot blast is distributed to the tuyères.

For the purposes of the present invention, the distribution pipe branch F for one tuyère D is connected to the latter through a special pipe G coaxial with the blast air passage $D^2$ in said tuyère. The pipe G, as shown has one end threaded into the associated tuyère D and has its other end connected to one end of the casing or body of a radiation pyrometer H. The associated bustle pipe branch F is connected to the pipe G intermediate its ends. As shown, the pipe G is provided with a depending dust pocket $G^1$ located between the pyrometer H and the connection to the branch pipe F and provided at its lower end with a closure $G^2$ which may be removed from time to time, for the elimination of furnace dust accumulating in the pocket. The tuyères D may be, and as shown are inclined to the horizontal so that they discharge upwardly directed blast air jets into the fusion zone of the furnaces.

The radiation pyrometer H diagrammatically shown in Fig. 1, comprises a lens system H' adapted to focus heat rays received from the fusion zone of the furnace through the bore of the pipe G onto a thermopile $H^2$ mounted in the radiation pyrometer casing. The radiation pyrometer H preferably employed is of the commercial "Radiamatic" type which is fully disclosed in Patent 2,357,193 granted August 29, 1944, on an application filed on September 24, 1941, by Thomas R. Harrison. As shown, I protect the pyrometer H against contact with hot air and gases, by interposing a gasketed, Pyrex glass window $H^3$ between the lens system H' and the adjacent end of the pipe G.

In the contemplated use of the apparatus shown in Fig. 1, the lens system H' should be focused on the incandescent material, mainly coke which in normal operation occupies the portion of the fusion zone of the furnace immediately in front of the tuyère opening $D^2$ through which heat rays are radiated to the pyrometer H.

In Fig. 2 I have illustrated diagrammatically by way of example, a control system including means for automatically regulating the temperature, supply rate and moisture content of the blast air supplied to the furnace A, in response to variations in the fusion zone temperature measured by the radiation pyrometer H. As diagrammatically shown in Fig. 2, the thermopile of the pyrometer H is connected by conductors $H^4$ to a potentiometer controller J. The latter may be of any one of various known types of measuring instruments including air controller provisions of such character that when the instrument is connected to piping K supplying compressed air at a suitable predetermined pressure, the instrument will maintain a controlling air pressure in its outlet piping $J^1$, which is a function of the temperature measured by the instrument, and increases or decreases as the fusion zone temperature increases above or decreases below a predetermined normal or control point temperature.

As shown in Fig. 2, blast air is drawn from the atmosphere by a rotary blower or air pump L at a rate dependent on the adjustment of valve M in the pump inlet L', and is passed by the pump L through a humidity regulator N, and thence partly through a stove or blast heat device O, and partly through a by-pass pipe P to a mixing valve Q, and thence into the bustle pipe E. The adjustment of the valve Q controls the temperature of the bustle pipe E by regulating the ratio of the portions of the blast air respectively passing through the stove O and preheated therein, and passing through the by-pass P without being preheated. As shown, the valve Q is of the fluid pressure motor type and is opened and closed as a result of variations in the pressure of air transmitted to the chamber Q' by a potentiometer air controller instrument R. The latter may be of a known commercial type, and measures the temperature of a thermocouple $R^2$ in the pipe through which the blast air passes to the bustle pipe E from the valve Q. The instrument R receives air under suitable pressure from the piping K, and maintains a pressure in the pipe $R^1$ which varies in a predetermined manner as the blast temperature measured by the instrument R varies relatively to the fusion zone temperature measured by the instrument J. In order that the instrument R may thus make the adjustment of the valve Q dependent on the relation of the blast temperature measured by the instrument R to the fusion zone temperature measured by the instrument J, the instrument R is provided with a suitable control point adjustment device S actuated by changes in the control pressure maintained in the piping J' by the instrument J. The device S may well be formed and associated with the measuring and control apparatus of the instrument R in the general manner disclosed in the Moore Patent 2,216,448, granted March 11, 1940.

The humidity regulator N may be of a known type including mechanism for increasing or decreasing the moisture content of the blast air as required to maintain a predetermined relation between the blast air moisture content and the control pressure transmitted to the regulator N through the pipe T' from the control pressure outlet of an instrument T. The instrument T includes means including a humidity responsive device $T^2$ for measuring the humidity of the air passing through the regulator N, and includes air controller mechanism associated with its measuring means and with a control point adjustment device S connected to the instrument J. The instrument T is thus adapted to maintain a predetermined relation between the moisture content of the blast air and the furnace zone temperature measured by the instrument J. As will be apparent, the character of the operation of the humidity regulator N under the control of the instrument T, does not depend on whether the furnace is operating with a so-called "wet blast," in which case the moisture content of the blast air is substantially greater than the ordinary or dry blast.

The air inlet valve M shown is of the fluid pressure motor type and is opened and closed by variations in the air pressure transmitted to its motor pressure chamber M' through the pipe U' from the control pressure outlet of an instrument U. The latter is a flow meter which directly measures the differential in the pressures at the opposite sides of a measuring orifice W in the inlet pipe of the blower L. The instrument U includes a control point adjusting device S like those previously described and similarly connected to the control pipe J' of the instrument J. The instrument U also includes air controller apparatus receiving air under suitable pressure through the piping K and transmits a controlling air through the pipe U' to the valve M adapted to adjust the latter and thereby vary the rate at which blast air is supplied to the furnace A in predetermined accordance with variations in the furnace zone temperature measured by the pyrometer H. While the air pressure in the bustle pipe E varies widely and rapidly from time to time as a result of changes in the furnace resistance to air flow through it, those pressure variations will not significantly effect the accuracy of the flow measurement made by the instrument U, since pressure changes at the outlet of the blower L do not produce similar changes in the blower inlet pressure.

As is well known to those skilled in the art, operating conditions in a blast furnace are complex, and variations in some one or another of those conditions may require compensating changes in other conditions. In general, however, the avoidance of unnecessary changes in blast furnace operating conditions contributes to the best operating results practically obtainable. The fusion zone temperature of a blast furnace measured in accordance with the present invention is a highly important operating condition and the use of the present invention makes it possible to maintain said temperature within more reasonable operating limits than is possible manually when other operating conditions require no change in that temperature and facilitates a particular or predetermined change in that temperature when a change in some other blast furnace operating condition make such a temperature change desirable.

In Fig. 2, means are provided for regulating the operation of a blast furnace by modifying each of three different furnace heating characteristics of the blast air, namely, its temperature, its rate of supply and its moisture content. As will be apparent, in some cases it may be practically desirable and sufficient to so modify only one, and in other cases to so modify two only of the above mentioned furnace heating characteristics of the blast air in accordance with variations in the fusion zone temperature.

While in accordance with the provisions of the statutes, I have illustrated and described the best form of embodiment of my invention now known to me, it will be apparent to those skilled in the art that changes may be made in the forms of the invention illustrated and described herein without departing from the spirit of my invention as set forth in the appended claims, and that in some cases certain features of my invention may be used to advantage without a corresponding use of other features.

Having now described my invention, what I claim as new and desire to secure by Letters Patent is:

1. In a blast furnace including tuyères and means for supplying blast air to the furnace through said tuyères, a radiation pyrometer means comprising a lens system receiving heat rays from the fusion zone of the furnace through one of said tuyères and focused on a portion of the fusion zone in front of said tuyère and a thermopile to which said heat rays are passed by said lens system, a measuring and control instrument connected to said pyrometer means and means automatically actuated by said instrument to modify a furnace heating characteristic of the blast air on variations in the amount of heat rays received by said pyrometer means.

2. In a blast furnace control system in which an air blast is supplied to the furnace, means to measure the temperature of the furnace at the fusion zone thereof comprising a blast furnace tuyère open at one end to the portion of said zone in front of the tuyère, a lens system receiving heat rays from said zone through said tuyère and a thermopile to which said rays are passed by said lens system, means to measure and control the flow of air to the blast, a potentiometer controller connected to said thermopile, said potentiometer controller being operatively connected to the means to measure and control the flow of air to the blast whereby the operation of said measuring and controlling means is modified in accordance with variations in the fusion zone temperature.

3. In a blast furnace control system in which an air blast is supplied to the furnace, means to measure the temperature of the furnace at the fusion zone thereof comprising a blast furnace tuyère open at one end to the portion of said zone in front of the tuyère, a lens system receiving heat rays from said zone through said tuyère and a thermopile to which said rays are passed by said lens system, means to measure and control the relative humidity of the air of said blast, a potentiometer controller connected to said thermopile, said potentiometer controller being operatively connected to the means to measure and control the relative humidity of the blast whereby the operation of said measuring and controlling means is modified in accordance with variations in the fusion zone temperature.

4. In a blast furnace control system in which an air blast is supplied to the furnace, means to measure the temperature of the furnace at the fusion zone thereof comprising a blast furnace tuyère open at one end to the portion of said zone in front of the tuyère, a lens system receiving heat rays from said zone through said tuyère and a thermopile to which said rays are passed by said lens system, means to measure and control the temperature of the air forming the blast, a potentiometer controller connected to said thermopile, said potentiometer controller being operatively connected to the means to measure and control the temperature of the air forming the blast whereby the operation of said measuring and controlling means is modified in accordance with variations in the fusion zone temperature.

5. In a blast furnace control system in which an air blast is supplied to the furnace, means to measure the temperature of the furnace at the fusion zone thereof comprising a blast furnace tuyère open at one end to the portion of said zone in front of the tuyère, a lens system receiving heat rays from said zone through said tuyère and a themopile to which said rays are passed by said lens system, means to measure and control the flow of air to the blast, means to measure and control the relative humidity of the air of said blast, means to measure and control the temperature of the air forming said blast, a potentiometer controller connected to said thermopile, said potentiometer controller being operatively connected to the means to measure and control the flow of air to the blast and to the means to measure and control the relative humidity of the air to said blast and to the means to measure and control the temperature of the air forming said blast whereby the operation of each of said measuring and controlling means is modified in accordance with variations in the fusion zone temperature.

JOSEPH P. VOLLRATH.

REFERENCES CITED

The following references are of record in the file of this patent:

UNITED STATES PATENTS

| Number | Name | Date |
|---|---|---|
| 1,458,288 | Graham | June 12, 1923 |
| 1,630,977 | Smoot | May 31, 1927 |
| 1,662,851 | Ebner | Mar. 20, 1928 |
| 1,667,355 | Norton | Apr. 24, 1928 |
| 1,872,783 | Miller | Aug. 23, 1932 |
| 2,354,400 | Percy | July 25, 1944 |
| 2,357,193 | Harrison | Aug. 29, 1944 |

OTHER REFERENCES

Clements, "Blast Furnace Practice," published 1929—vol. I, pages 166–169, 468, 469; vol. II, pages 466–468, 495, 496; vol. III, pages 45, 46, 49.